UNITED STATES PATENT OFFICE.

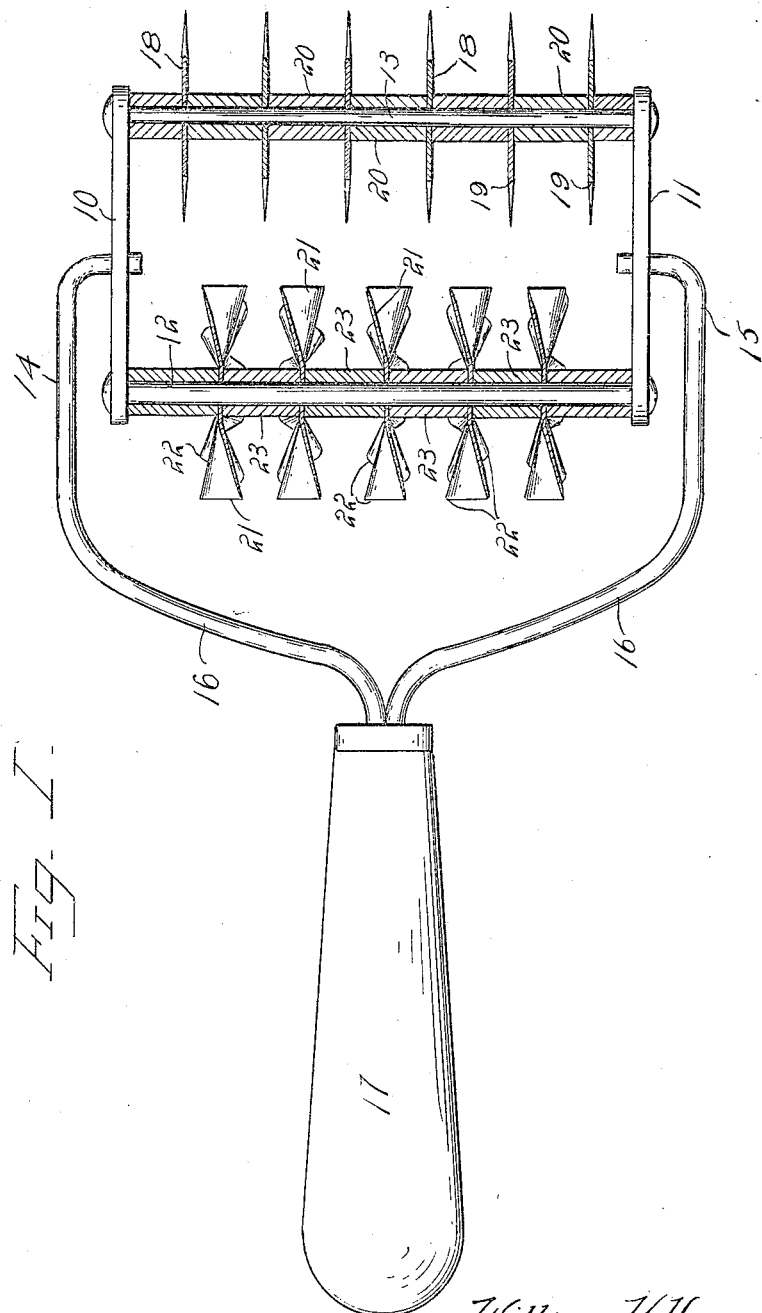

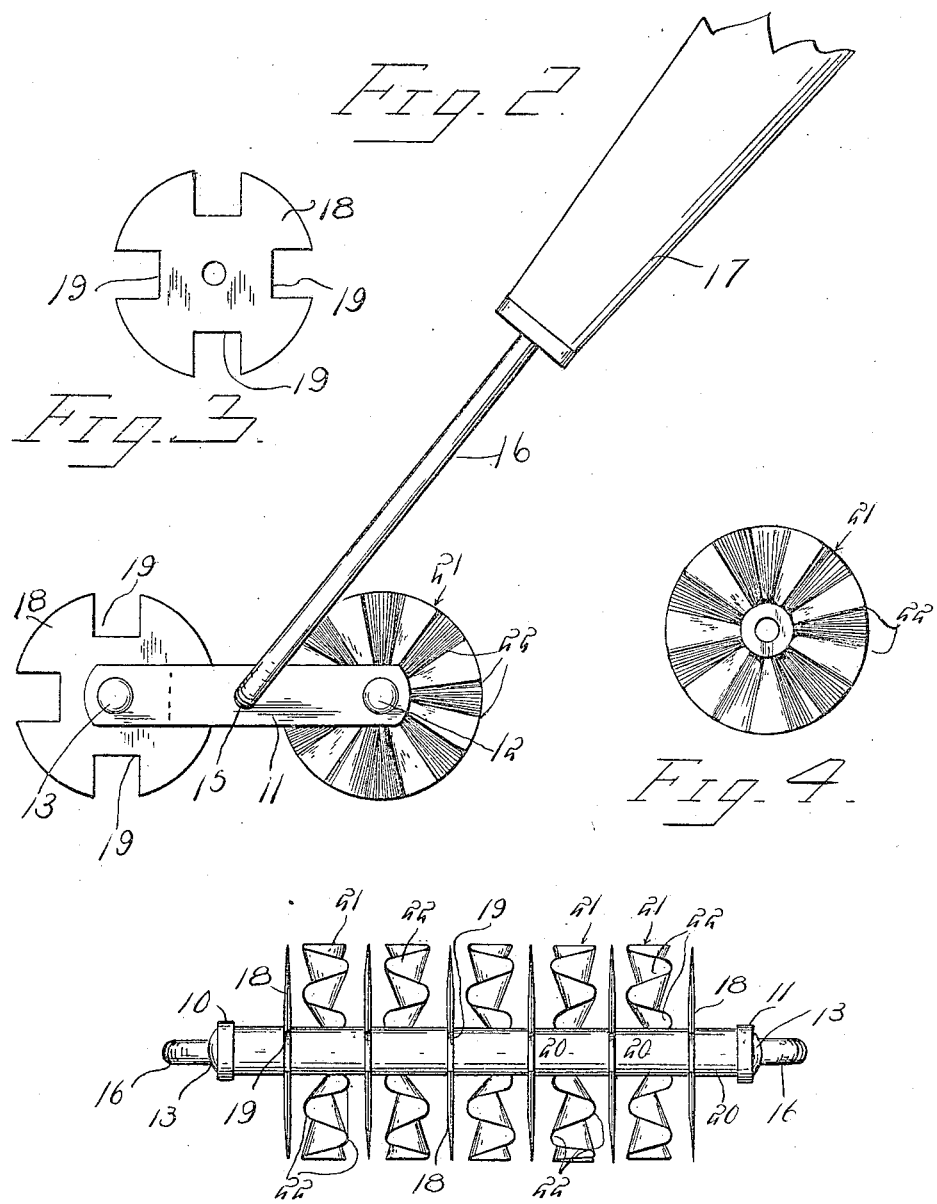

WILLIAM H. HUMESTON, OF DENVER, COLORADO.

MEAT-TENDERER.

942,448.

Specification of Letters Patent.

Patented Dec. 7, 1909.

Application filed April 20, 1909. Serial No. 490,984.

*To all whom it may concern:*

Be it known that I, WILLIAM H. HUMESTON, a citizen of the United States, residing at Denver, in the county of Denver, State of Colorado, have invented certain new and useful Improvements in Meat-Tenderers; and I do hereby declare the following to be a full, clear, and exact description of the invention, such as will enable others skilled in the art to which it appertains to make and use the same.

This invention relates to implements employed for tendering meat, and for like purposes, and has for one of its objects to provide a simply constructed device of this character of increased efficiency and utility.

With this and other objects in view, the invention consists in certain novel features of construction as hereafter shown and described and then specifically pointed out in the claims, and in the drawings illustrative of the preferred embodiment of the invention, Figure 1 is a plan view of the improved device, partly in section. Fig. 2 is an end elevation of the same. Figs. 3 and 4 are side elevations of the two forms of cutting blades employed in the improved implement. Fig. 5 is a rear elevation of the improved implement.

The improved implement comprises a supporting frame formed of end members 10—11 connected by two rods 12—13, the rods spaced apart and arranged in parallel relations, as shown. Swinging at 14—15 upon the end members 10—11 is a bail-like member 16 having a handle 17 extending centrally therefrom, the bail member being large enough for frame to swing therethrough as shown. Mounted for rotation upon the rod 13 are a plurality of cutting blades 18, each blade having a plurality of radially arranged recesses 19. The blades 18 are spaced at uniform distances apart and separated by spacer members 20, or otherwise supported in position upon the rod. Any required number of the blades 18 may be employed but for the purpose of illustration six of the blades are shown, which will be the number usually employed. Mounted for rotation upon the rod 12 are a plurality of cutting blades 21, the last mentioned blades each formed with a plurality of corrugations 22 in its rim. The blades 21 are spaced apart upon the rod 12, and separated by spacer members 23. The blades 21 will be so arranged that each of the blades 21 comes opposite the space between two of the blades 18, as shown. By this simple means it will be obvious that an efficient and effectual implement is produced which will cut the fibers of the meat without bruising or mashing the same.

The cutting blades may be of any required size, and any required number may be employed. The blades will preferably be of tempered steel, while the remaining parts will be of suitable metal, and tinned, galvanized, or otherwise coated to prevent corrosion.

The entire implement being of metal, and every part exposed, the implement may be readily cleansed after each operation.

What is claimed is:—

1. An implement of the class described comprising a plurality of cutting blades arranged in parallel relations and mounted for rotation, each blade having a plurality of radial recesses in its rim, and a plurality of cutting blades arranged in parallel relation and spaced apart and mounted for rotation, each of said last mentioned blades having its rim corrugated and located opposite the spaces between the first mentioned blades.

2. An implement of the class described comprising a supporting frame including spaced side members and rods spaced apart and connecting said side members, a plurality of cutting blades arranged in parallel relations and mounted for rotation upon one of said rods, each of said blades having a plurality of radial recesses in its rims, and a plurality of cutting blades arranged in parallel relations and spaced apart and mounted for rotation upon the other of said rods, each of said last mentioned blades having its rim corrugated and located opposite the spaces between the first mentioned blades.

3. An implement of the class described comprising a frame formed with spaced end members and connecting rods spaced apart and arranged in parallel relations, a handle swinging from said end members intermediate said rods, a plurality of cutting blades arranged in parallel relations and mounted for rotation upon one of said rods, said blades having a plurality of recesses in its rim, and a plurality of cutting blades spaced apart and mounted for rotation upon the other of said rods, each of said last mentioned blades having its rim corrugated and located opposite the spaces between the first mentioned blades.

In testimony whereof, I affix my signature, in presence of two witnesses.

WILLIAM H. HUMESTON.

Witnesses:
 WM. D. PEIRCE,
 WILLY J. C. LUDDERS.